(12) United States Patent
Degertekin et al.

(10) Patent No.: US 7,116,430 B2
(45) Date of Patent: Oct. 3, 2006

(54) HIGHLY-SENSITIVE DISPLACEMENT-MEASURING OPTICAL DEVICE

(75) Inventors: Fahrettin Levent Degertekin, Decatur, GA (US); Neal Allen Hall, Atlanta, GA (US); Wook Lee, Atlanta, GA (US)

(73) Assignee: Georgia Technology Research Corporation, Atlanta, GA (US)

( * ) Notice: Subject to any disclaimer, the term of this patent is extended or adjusted under 35 U.S.C. 154(b) by 335 days.

(21) Appl. No.: 10/704,932

(22) Filed: Nov. 10, 2003

(65) Prior Publication Data

US 2004/0130728 A1     Jul. 8, 2004

Related U.S. Application Data

(63) Continuation-in-part of application No. 10/112,490, filed on Mar. 29, 2002, now Pat. No. 6,753,969.

(60) Provisional application No. 60/424,810, filed on Nov. 8, 2002.

(51) Int. Cl.
  *G01B 11/02* (2006.01)
  *G01B 9/02* (2006.01)
(52) U.S. Cl. .................. 356/505; 356/498; 356/521
(58) Field of Classification Search ................ 356/498, 356/505, 521, 506; 385/12
  See application file for complete search history.

(56) References Cited

U.S. PATENT DOCUMENTS

| 4,188,124 A | 2/1980 | Jaerisch et al. ............. 356/356 |
| 4,656,347 A * | 4/1987 | Une et al. ................... 356/505 |
| 5,047,633 A | 9/1991 | Finlan et al. ................ 250/306 |
| 5,247,186 A | 9/1993 | Toda ........................... 250/561 |
| 5,253,515 A | 10/1993 | Toda et al. .................... 73/105 |
| 5,402,234 A | 3/1995 | Deck ........................... 356/497 |
| 5,445,011 A | 8/1995 | Ghislain et al. ............... 73/105 |
| 5,526,116 A | 6/1996 | de Groot ..................... 356/354 |
| 5,565,987 A | 10/1996 | Jain et al. .................... 356/352 |
| 5,900,729 A | 5/1999 | Moser et al. ................. 324/244 |
| 5,908,981 A | 6/1999 | Atalar et al. .................. 73/105 |
| 5,908,987 A | 6/1999 | Raj ........................... 73/514.09 |
| 5,923,033 A | 7/1999 | Takayama et al. .......... 250/234 |
| 5,952,657 A | 9/1999 | Alexander et al. .......... 250/306 |

(Continued)

FOREIGN PATENT DOCUMENTS

JP            05248810         9/1992

(Continued)

OTHER PUBLICATIONS

Zygo Corporation, "Zygo Corporation's New View 5000™; Precise, Rapid, Noncontact 3D Surface Profiling," Apr. 2001.

(Continued)

*Primary Examiner*—Gregory J. Toatley, Jr.
*Assistant Examiner*—Patrick Connolly
(74) *Attorney, Agent, or Firm*—Thomas, Kayden, Horstemeyer & Risley, LLP

(57) ABSTRACT

The present invention relates to micron-scale displacement measurement devices. A first embodiment is a device that includes a substrate and a rigid structure suspended above the substrate to form a backside cavity. Formed in the rigid structure is a reflective diffraction grating positioned to reflect a first portion of an incident light and transmit a second portion of the incident light such that the second portion of the incident light is diffracted. The device also includes a membrane positioned a distance d above the reflective diffraction grating and at least a first photodetector for receiving interference patterns produced from the first portion of the incident light reflected from the diffraction grating and the second portion of the incident light reflected from the membrane.

56 Claims, 5 Drawing Sheets

U.S. PATENT DOCUMENTS

| | | | |
|---|---|---|---|
| 6,028,305 A | 2/2000 | Minne et al. | 250/234 |
| 6,038,057 A | 3/2000 | Brazas, Jr. et al. | 359/291 |
| 6,181,097 B1 | 1/2001 | Li et al. | 318/592 |
| 6,196,061 B1 | 3/2001 | Adderton et al. | 73/105 |
| 6,247,747 B1 | 6/2001 | Kawanomoto et al. | 296/191 |
| 6,251,755 B1 | 6/2001 | Furukawa et al. | 438/510 |
| 6,272,907 B1 | 8/2001 | Neukermans et al. | 73/105 |
| 6,279,389 B1 | 8/2001 | Adderton et al. | 73/105 |
| 6,291,927 B1 | 9/2001 | Percin et al. | 310/324 |
| 6,341,526 B1 * | 1/2002 | Castracane et al. | 73/705 |
| 6,400,166 B1 | 6/2002 | Babson et al. | 324/754 |
| 6,445,109 B1 | 9/2002 | Percin et al. | 310/324 |
| 6,523,392 B1 | 2/2003 | Porter et al. | 73/24.01 |
| 6,567,572 B1 | 5/2003 | Degertekin et al. | 385/12 |
| 6,672,144 B1 | 1/2004 | Adderton et al. | 73/105 |
| 6,678,813 B1 | 1/2004 | Le | 711/172 |
| 6,684,686 B1 | 2/2004 | Itsuji et al. | 73/105 |
| 6,827,979 B1 | 12/2004 | Mirkin et al. | 427/256 |
| 6,836,112 B1 | 12/2004 | Hennessy | 324/300 |
| 6,862,923 B1 | 3/2005 | Buguin et al. | 73/105 |
| 6,862,924 B1 | 3/2005 | Xi et al. | 73/105 |
| 6,882,429 B1 | 4/2005 | Weitekamp et al. | 356/482 |
| 6,884,981 B1 | 4/2005 | Proksch et al. | 250/201.3 |
| 2001/0000279 A1 | 4/2001 | Daniels et al. | 73/105 |
| 2001/0013574 A1 | 8/2001 | Warren et al. | 250/234 |
| 2001/0035700 A1 | 11/2001 | Percin et al. | 310/324 |
| 2001/0049959 A1 | 12/2001 | Neukermans et al. | 73/105 |
| 2002/0039463 A1 | 4/2002 | Degertekin et al. | 385/12 |
| 2002/0163648 A1 | 11/2002 | Degertekin et al. | 356/499 |
| 2003/0033863 A1 | 2/2003 | Ashby et al. | 73/105 |
| 2003/0042409 A1 | 3/2003 | Warren et al. | 250/234 |
| 2003/0047675 A1 | 3/2003 | Proksch et al. | 250/234 |
| 2003/0200798 A1 | 10/2003 | Lindig et al. | 73/105 |
| 2004/0065821 A1 | 4/2004 | Warren et al. | 250/234 |
| 2004/0127025 A1 | 7/2004 | Crocker, Jr. et al. | 438/677 |
| 2004/0129063 A1 | 7/2004 | Balooch et al. | 73/105 |
| 2004/0154367 A1 | 8/2004 | Oumi et al. | 72/325 |
| 2004/0206165 A1 | 10/2004 | Minne et al. | 73/105 |
| 2004/0216517 A1 | 11/2004 | Xi et al. | 73/105 |
| 2005/0013230 A1 | 1/2005 | Adelmann | 369/101 |
| 2005/0017173 A1 | 1/2005 | Kumar | 250/306 |
| 2005/0048651 A1 | 3/2005 | Ryttsen et al. | 435/459 |
| 2005/0066714 A1 | 3/2005 | Adderton et al. | 73/105 |
| 2005/0145021 A1 | 7/2005 | Chand et al. | 73/105 |
| 2005/0180678 A1 | 8/2005 | Panepucci et al. | 385/13 |
| 2005/0181132 A1 | 8/2005 | Mirkin et al. | 427/256 |

FOREIGN PATENT DOCUMENTS

| | | |
|---|---|---|
| JP | 07065428 | 3/1995 |
| JP | 10073608 | 3/1998 |
| JP | 10090287 | 4/1998 |
| JP | 200493574 | 3/2004 |

OTHER PUBLICATIONS

Cooper et al., "High-resolution micromachined interferometric accelerometer," Applied Physics Letters, vol. 27, No. 22, May 29, 2000, pp. 3316-3318.

Manalis, et al., "Interdigital cantilevers for atomic force microscopy," Applied Physics Letters, vol. 65, No. 25, Dec. 16, 1996, pp. 3944-3946.

Yaralioglu et al., "Analysis and design of an interdigital cantilever as a displacement sensor," Journal of Applied Physics, vol. 83, No. 12, Jun. 15, 1998, pp. 7405-7415.

Chen et al., "Overview of three-dimensional shape measurement using optical methods," Optical Engineering, vol. 39, No. 1, Jan. 2000, pp. 10-22.

DeWitt et al., "Range-finding method using diffraction gratings," Applied Optics, vol. 34, No. 14, May 10, 1995, pp. 2510-2521.

Solgaard, et al., "Deformable grating optical modulator," Optics Letters, vol. 17, No. 9, May 1, 1992, pp. 688-690.

Ming C. Wu, "Micromachining for Optical and Optoelectronic Systems," Proceedings of the IEEE, vol. 85, No. 11, Nov. 1997, pp. 1833-1856.

Shiono et al., "Planar-optic-disk pickup with diffractive microoptics," Applied Optics, vol. 33, No. 31, Nov. 1, 1994, pp. 7350-7355.

Jahns et al., "Rapid Communications: Planar integration of free-space optical components," Applied Optics, vol. 28, No. 9, May 1, 1989, pp. 1602-1607.

* cited by examiner

HIGHLY-SENSITIVE DISPLACEMENT-MEASURING OPTICAL DEVICE

CROSS-REFERENCE TO RELATED APPLICATION

This application is a Continuation-in-Part application of the following U.S. utility patent application "Microinterferometers With Performance Optimization," having Ser. No. 10/112,490, filed Mar. 29, 2002 now U.S. Pat. No. 6,753,969. This application is also related to the following co-pending U.S. utility patent application "System and Method for Surface Profiling," having Ser. No. 10/113,362, filed Mar. 29, 2002.

This application claims priority to the following co-pending U.S. provisional application "Miniature Diffraction-Based Optical Sensors," having Ser. No. 60/424,810 filed Nov. 8, 2002.

STATEMENT REGARDING FEDERALLY SPONSORED RESEARCH OR DEVELOPMENT

The U.S. Government may have a paid-up license in this invention and the right in limited circumstances to require the patent owner to license to others on reasonable terms as provided for by the terms of Contract No. DAAD19-00-1-0174, awarded by the U.S. Army.

FIELD OF THE INVENTION

The present invention generally relates to measurement devices. More specifically, the invention relates to highly-sensitive, micron scale, displacement measurement devices.

DESCRIPTION OF THE RELATED ART

Hearing aids, for example, provide specific applications in which micron-scale displacement measurement devices may be used. Tiny microphone arrays are currently housed in hearing aids to pick up slight acoustic pressures. Today's microphones measure a change in capacitance between two conducting plates, one of which (the microphone diaphragm) moves as a function of the acoustic pressure applied.

There are various drawbacks to today's micromachined capacitive microphones. The electrical sensitivity of the microphone, $S_e$, is defined as the change in voltage output per change in membrane displacement. In a similar fashion, the mechanical sensitivity, $S_m$, is defined as the change in membrane displacement per change in applied pressure (i.e. $S_m$ is simply the compliance or softness of the membrane). The total sensitivity of the device to sound pressure can then be expressed as $S_e \times S_m$, with units of Volts/Pa. For high $S_e$, a large DC bias voltage should be applied and the gap height between the electrodes should be made as small as possible, typically on the order of 2 μm. These two requirements are, in fact, in conflict, as the maximum DC bias that can be used is limited by the electrostatic collapse voltage, which decreases with shrinking gap height. The electrical sensitivity is a maximum when the device is biased near this electrostatic collapse voltage. Unfortunately, the detection scheme becomes nonlinear under this same condition. In addition to this drawback, implementation of the constant charge condition requires the use of high impedance amplifiers, which come with high electronic noise. To compensate for poor $S_e$, micromachined capacitive microphones must use large, soft membranes on the order of 1–5 mm to enhance mechanical sensitivity and, in turn, the overall device performance. Even this approach is limited, however, by membrane stresses that result during fabrication. These stresses bound the mechanical sensitivity that can be achieved and make the fabrication of uniform membranes with high yield difficult. In addition to using a soft membrane, the back electrode must be perforated and open to a large backside cavity to prevent additional stiffening which would otherwise occur from compression of the air in the thin gap. The perforation reduces the active capacitance and adversely affects $S_e$, leading to yet another design conflict. In summary, the electrical and mechanical sensitivity in a micromachined capacitive microphone are not independent and impose severe design and fabrication limitations.

Optical interferometry is the act of splitting and recombining electromagnetic waves, in particular, visible light waves, to measure surface geometries, distance, etc. The advancement in interferometry has come in many avenues of technology. Long-range telescopes, high-precision spectrometers, compact disc players, etc., use some form of interferometry. Micro-machinery is a growing technology field that often utilizes interferometers because they typically have high resolution and precision. In general, displacement measurements in the sub-nanometer range can be detected with today's interferometers. To examine microscale structures, the lateral resolution of the interferometers, generally, need to be improved. This can be achieved by coupling the interferometer to a regular microscope. Unfortunately, the size of the interferometer becomes rather large and subsequently may not fit in small spaces for inspection. Furthermore, to inspect a large number of microscale structures either the sample or microscope objective is scanned, resulting in slow imaging.

In order to obtain interferometric measurement sensitivity in a small volume, several methods have been developed. One of these methods involves phase sensitive diffraction gratings as described in a technical paper entitled "Interdigital cantilevers for atomic force microscopy," published in *Appl. Phys. Lett.*, 69, pp. 3944–6, Dec. 16, 1996 by S. R. Manalis, S. C. Minne, A. Atalar, and C. F Quate and also in U.S. Pat. No. 5,908,981 to Atalar et al.

Similar structures are also used in microaccelerometers to measure the displacement of a control mass with interferometric precision as described in a paper written by E. B. Cooper, E. R. Post, and S. Griffith and entitled "High-resolution micromachined interferometric accelerometer," Appl. Phys. Lett., 76 (22), pp. 3316–3318, May 29, 2000. Both of these papers are incorporated by reference in their entireties.

Based on the foregoing, it would be desirable to incorporate optical interferometry with micro-machined microphone technology so as to improve over the current prior art. Furthermore, it would be desirable to explore other aspects in which highly-sensitive, micron-scale displacement measurement devices may be utilized.

SUMMARY OF THE INVENTION

The present invention relates to micron scale devices for accurately measuring the movement of a flexible membrane (i.e., a microphone diaphragm) that is affected by a number of possible external excitations, such as acoustic pressure, a chemical reaction, and other physical forces.

A first embodiment may be construed as a device that includes a substrate and a rigid structure suspended above the substrate to form a backside cavity. Formed in the rigid structure is a reflective diffraction grating positioned to reflect a first portion of an incident light and transmit a second portion of the incident light such that the second portion of the incident light is diffracted. The device also includes a membrane positioned a distance d above the reflective diffraction grating and at least a first photo-detector for receiving interference patterns produced from the first portion of the incident light reflected from the diffraction grating and the second portion of the incident light reflected from the membrane.

A second embodiment may be construed as a device that includes a substrate a tunable, phase-sensitive, reflective diffraction grating formed atop the substrate. The diffraction grating is configured to reflect a first portion of an incident light and transmit a second portion of the incident light, such that the second portion of the incident light is diffracted. The diffraction grating is further configured to be controllably adjusted. The device also includes at least a first electrode deposited on the substrate and a membrane bridge structure positioned above the diffraction grating. The device further includes a photo-detector for receiving interference patterns produced from the first portion of the incident light reflected from the diffraction grating and the second portion of the incident light reflected from the membrane bridge structure and a controller coupled to the at least first electrode and the diffraction grating for adjusting the diffraction grating, such that the interference patterns are altered.

Another embodiment of the invention may be construed as a device that includes a relatively opaque platform comprising a reflective surface, a transparent membrane suspended above the reflective surface, and a phase-sensitive reflective diffraction grating formed atop the transparent membrane. The transparent membrane is positioned such that a distance d is created between the diffraction grating and the reflective surface.

Another embodiment of the invention may be construed as a micromachined, optoelectronic microphone that includes a phase-sensitive reflective diffraction grating for reflecting a first portion of an incident light and transmitting a second portion of the incident light such that the second portion of the incident light is diffracted. The microphone also includes a microphone diaphragm positioned a distance d above the diffraction grating. In this manner, the second portion of the incident light is reflected off of the microphone diaphragm in such a way that an interference pattern is formed by the reflected first portion and the reflected second portion of the incident light.

Other devices, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION

As will be described in greater detail herein, displacement measurement devices in accordance with the present invention can measure the change in position of a membrane as a function of time due to a variety of factors. Furthermore, the displacement measurement devices can be optimized for displacement sensitivity and reduced noise causing a greater signal to noise ratio (SNR).

Figure 1:
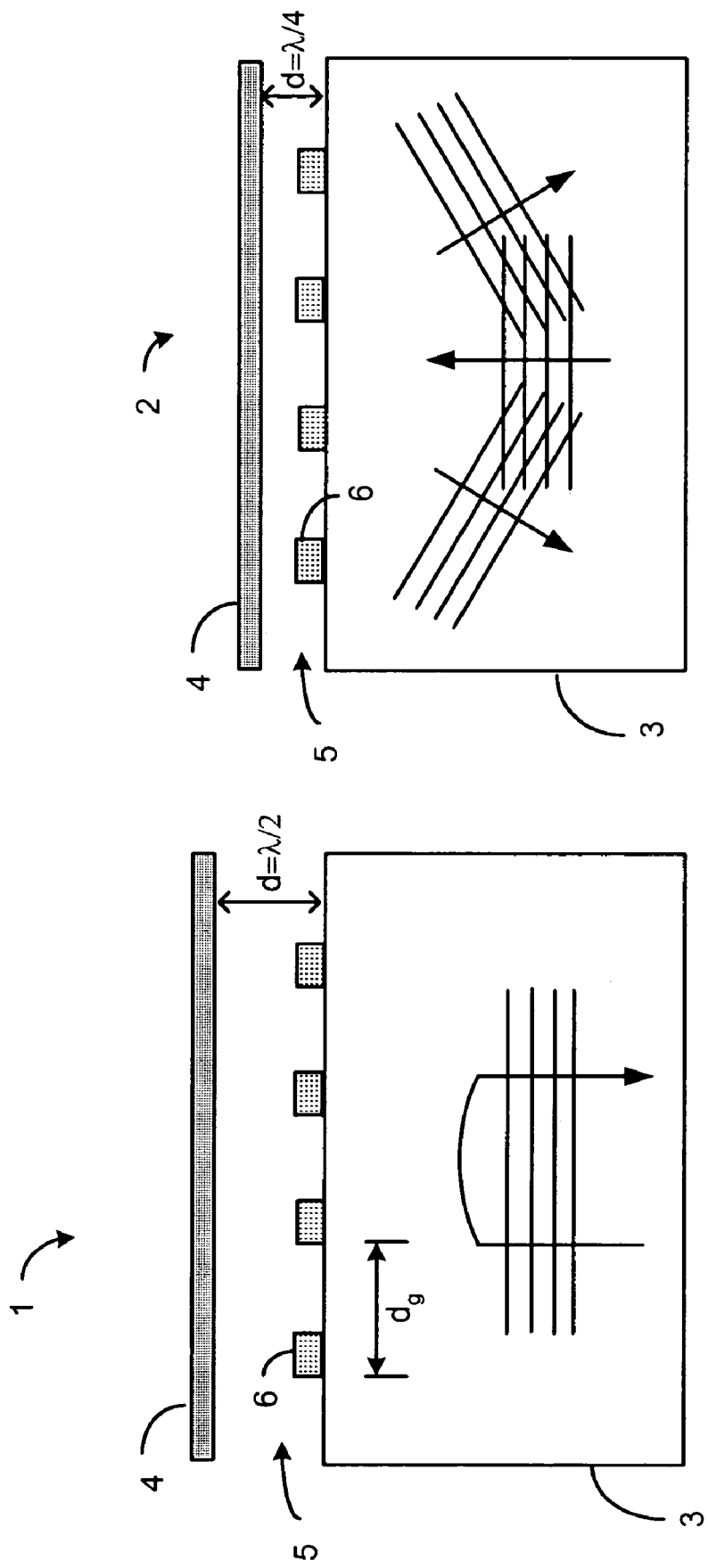
FIG. 1 is a diagram illustrating the concept of using a diffraction grating to split beams in a microinterferometer.

Referring now in more detail to the drawings, FIG. 1 is a diagram illustrating the concept of using a diffraction grating to split beams in a microinterferometer. This concept has been utilized in measuring precise relative displacements, such as for the measurement of Atomic Force Microscopy (AFM) tip displacement and in spatial light modulators, as in the grating light valves (GLV). This concept is also disclosed in U.S. Pat. No. 6,567,572 entitled "Optical Displacement Sensor" to F. L. Degertekin, G. G. Yaralioglu, and B. Khuri-Yakub, which is incorporated by reference in its entirety. AFM, in general, is a technique for analyzing the surface of a rigid material at the atomic level. AFM uses a mechanical probe to magnify surface features up to 100,000,000 times, and it can produce 3-D images of the surface. In general, a GLV contains several tiny reflective ribbons that are mounted over a silicon chip with a tiny air gap in between the chip and the ribbons. When a voltage is applied to the chip below a particular ribbon, that ribbon bends toward the chip by a fraction of a wavelength of an illuminating light. The deformed ribbons collectively form a diffraction grating and the various orders of the light can be combined to form the pixel of an image. The shape of the ribbons, and therefore the image information, can be changed in as little as 20 billionths of a second.

The diagram of FIG. 1 illustrates two scenarios. A first scenario 1 shows what occurs when a target surface 4 is placed a distance of a half-wavelength, $\lambda/2$, away from a reference point, in this case, a reflective diffraction grating 5. A second scenario 2 shows what occurs when the target surface 4 is placed a distance of a quarter-wavelength, $\lambda/4$, away from the diffraction grating 5. The detailed diffraction pattern of such a structure can be found by applying standard diffraction theory to determine the locations and the dimensions of the photo-detectors or light guide apertures.

In both instances, the reflective diffraction grating 5 is formed on a transparent substrate 3. Exemplary materials that may be utilized to construct such elements will be discussed in further detail in relation to FIG. 4. The diffraction grating 5 is formed of an array of diffraction grating fingers 6 equally spaced along a front edge of the transparent substrate 3. It should be noted that, as mentioned above, this diagram is not to scale, and is merely for illustrative purposes. In reality, the diffraction grating fingers 6 would typically have a height on the order of micro- or nano-meters.

In the first scenario 1, when an incident light is illuminated through the transparent substrate 3, a first portion of the incident light is reflected from the reflective diffraction grating 5. A second portion of the incident light is transmitted and diffracted about the diffraction grating fingers 6. The transmitted and diffracted light reflects off of the target surface 4 and is measured by a proper detection unit (not shown), such as a photo-detector or a photo-diode. As in scenario 1, the target surface is placed at a distance of $\lambda/2$ or any integer multiple, thereof. In this case, the $0^{th}$ order of the transmitted incident light is reflected back. In general, the $0^{th}$ order is the transmitted light that is illuminated directly, in which case no diffraction, or change in direction occurs. The first portion of the incident light, and the second portion of the incident light which has been reflected off of the target surface 4 interferes with each other. The phase of the two portions of the light waves help form constructive and destructive interference patterns. From the interference patterns, the relative distance between the diffraction grating 5 and the target surface 4 can be determined.

In scenario 2, the same general structure is set up. In this case, the target surface 4 is placed a distance of $\lambda/4$ away from the diffraction grating 5. In practice, the target surface 4 may be placed at any integer multiple of $\lambda/4$ and the same general results will occur. When the first portion of the incident light joins with the second portion of the incident light upon reflection, destructive interference cancels out the two. The second portion of the light travels an extra distance of 2× the distance between the target surface 4 and the diffraction grating 3, which results in a phase difference between the two portions of π, complete destructive interference. On the contrary though, the higher order diffraction fields, such as the first order, can constructively interfere with the first portion of the incident light. As FIG. 1 depicts, the higher order first and second portions of the incident light are angled and not parallel to the line of illumination, like the $0^{th}$ order beam.

Figure 2:
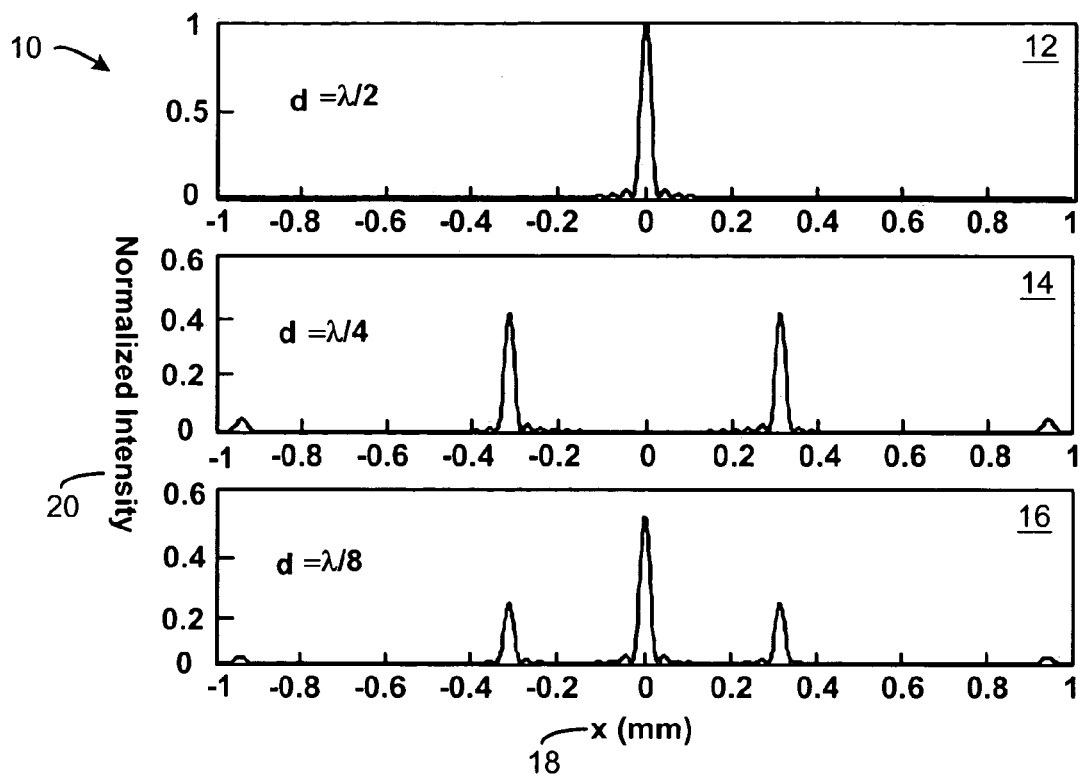
FIG. 2 is a graph illustrating the distribution of reflected light measured on an observation plane with various gap thicknesses utilizing the method illustrated in FIG. 1.

Having described an example of using a diffraction grating to split light beams and therefore measure relative distance, theoretical calculations will be utilized to show the results of using the method described in FIG. 1. Suppose an incident light of $\lambda=632$ nm is illuminated through the transparent substrate 3 onto the reflective diffraction grating 5. A laser can be utilized to provide the incident light. In this case, a helium-neon (HeNe) laser can be utilized. Suppose the diffraction grating 5 contains 10 diffraction grating fingers 6 equally spaced at $d_g=2$ μm. FIG. 2 is a graph 10 illustrating the distribution of reflected light measured on an observation plane with various gap thicknesses utilizing the method illustrated in FIG. 1. Hereinafter, the distance between a reference point, in this case the diffraction grating 5, and the target surface 4 will be referred to as the gap thickness and can be considered the absolute distance to the surface.

FIG. 2 shows the normalized intensity of reflected light 20 versus an observation length, x 18. The observation length, x, is in the lateral direction, and centered at the $0^{th}$ order beam. In this case, a 100 μm wide photo-detector has been used. Three scenarios are shown in the graph 10. Scenario 12 shows the normalized intensity 20 with gap thickness, $d=\lambda/2$. Scenario 14 shows the normalized intensity 20 with gap thickness, $d=\lambda/4$. Scenario 16 shows the normalized intensity 20 with gap thickness, $d=\lambda/8$.

As expected, scenario 12 shows the $0^{th}$ order reflected beam with complete constructive interference. The higher order beams, e.g. the $1^{st}$ and $3^{rd}$ order beams, incur destructive interference and so their intensity is cancelled out. Scenario 14 shows that the $0^{th}$ order has been completely cancelled out and the $1^{st}$ and the $3^{rd}$ orders of the reflected beam appear to have partial intensity. Scenario 16 shows that when the gap thickness, $d=\lambda/8$, both the $0^{th}$ order and the $1^{st}$ order contain some light intensity. Perhaps, most importantly, graph 10 attempts to show the periodic nature of the intensity of the orders of the reflected light versus varying gap thickness.

Figure 3:
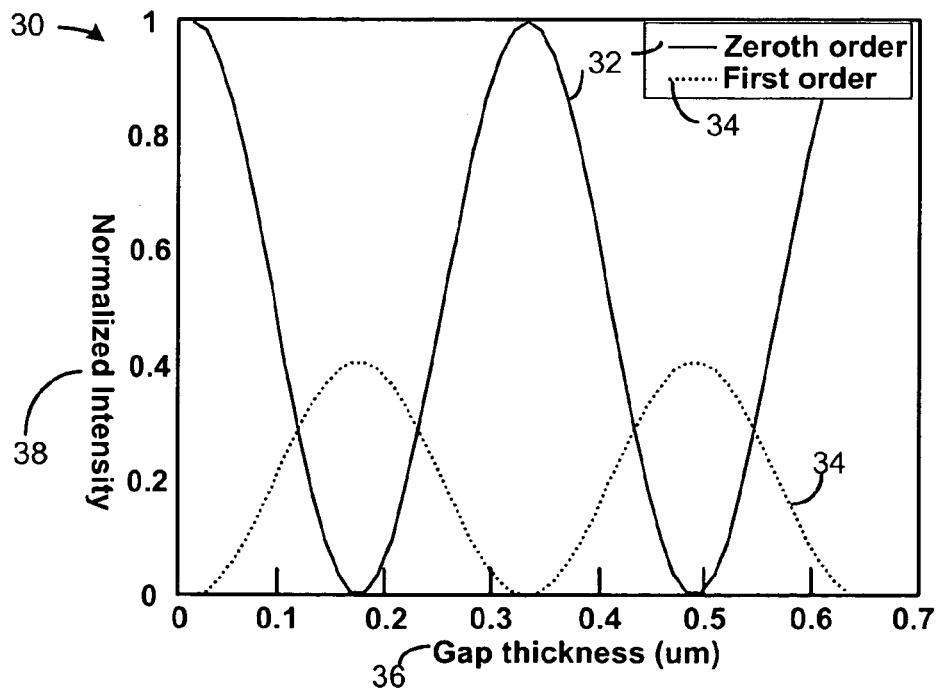
FIG. 3 is a graph illustrating the normalized intensity of various diffraction orders vs. gap thickness utilizing the method illustrated in FIG. 1.

The intensity of these orders as a function of grating-reflecting surface shows the $\cos^2(2\pi d/\lambda)$ and $\sin^2(2\pi d/\lambda)$ variation, as illustrated in FIG. 3. FIG. 3 is a graph 30 illustrating the normalized intensity 38 of various diffraction orders 32 and 34 versus gap thickness 36 utilizing the method described in FIG. 1.

As shown in FIG. 3, the $0^{th}$ order curve 32 takes on a $\cos^2(2\pi d/\lambda)$ shape. This is in line with the results found in FIG. 2. At gap thickness of $\lambda/2$, which is approximately 0.3161 μm, the intensity is greatest. At gap thickness of $\lambda/4$, which is approximately 0.158 μm, the intensity is zero. The $1^{st}$ order curve 34 takes on a $\sin^2(2\pi d/\lambda)$ shape. The graph 30 of FIG. 3 clearly displays the periodic nature of the diffraction orders. As one can see, keeping all other variables constant and known, one can calculate the relative distance by measuring the intensity of the orders, in particular the $1^{st}$ order. In fact, by monitoring the intensity of any of the reflected orders, one can achieve interferometric resolution on the order of $1\times10^{-5}$ Å/$\sqrt{Hz}$.

The present invention provides a sensitive diffraction based optical displacement apparatus and method to measure the static and dynamic displacement of reflectors in various applications. The present invention includes the use of any type of reflector, however, in a preferred embodiment, the present invention includes a flexible and optically reflective membrane. The apparatus and method of the present invention is amenable to integration of electronics and optics to form compact displacement detectors for a single membrane or membranes fabricated in the form of arrays. Typical applications of the present invention would be in, for instance, but not limited to, microphones (micro-machined or not), micro-machined ultrasonic transducers, micro-machined ultrasonic wave generators, micro-machined ultrasonic image applications, pressure sensors and hearing aids. The present invention would also be useful in any sensing application where the position of a reflector or membrane is changed due to a chemical or physical process and this displacement needs to be measured accurately in a broad frequency range. Furthermore, the present invention would also be useful in any sensing application where the reflectivity of a reflector or a membrane is changed due to a chemical or physical process and this change needs to be measured accurately in a broad frequency range.

U.S. Pat. No. 6,567,572 entitled "Optical Displacement Sensor" discloses various embodiments of a micro-machined optical displacement sensor. For example, FIG. 4 of U.S. Pat. No. 6,567,572 illustrates an optical displacement sensor that includes a reflective diffraction grating 430 deposited upon a transparent substrate 420. Suspended above the diffraction grating 430 is a reflector 410. A voltage bias is applied across the reflector 410 and diffraction grating 430 so as to electrostatically actuate the reflector 410 to vary its position and/or rigidity.

An improvement to the sensor of U.S. Pat. No. 6,567,572 is embodied in the present invention. That is to add a semi-transparent layer to the top of the transparent substrate 420. This mirror layer can be built using a thin metal film and a dielectric stack of alternating quarter-wave thick media. Preliminary testing shows the thickness of the mirror layer and the reflectivity of the metal used can greatly increase the sensitivity of the sensor. To complement the mirror layer placed on the transparent substrate 420 would be the reflective surface of the reflective membrane 410. Similar testing of the thickness of the mirrored reflective layer of the membrane 410 and the material used proved complimentary results, however, keeping in mind that added thickness and the various materials used can affect the rigidity of the reflective membrane 410.

Figure 4:
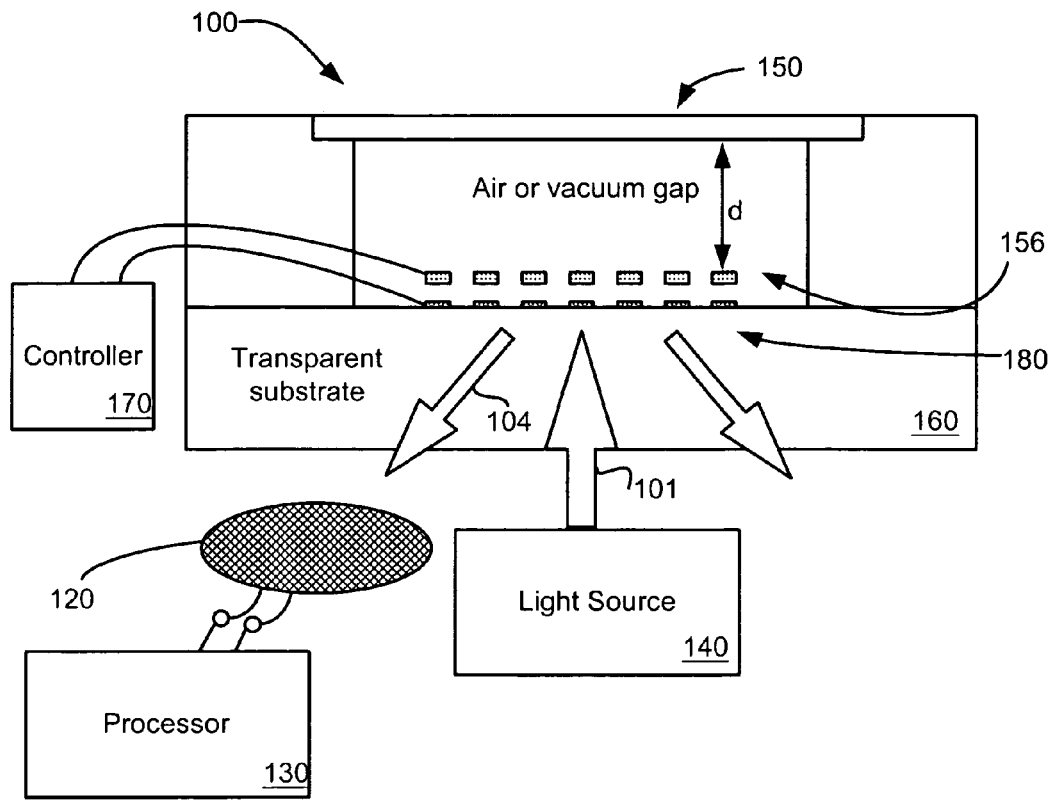
FIG. 4 is a diagram illustrating an embodiment of a micro-displacement measurement device in accordance with the present invention.

FIG. 4 is a diagram illustrating a first embodiment of a micro-displacement measurement device 100 in accordance with the present invention. As shown in FIG. 4, the present invention provides for the use of a tunable, phase-sensitive diffraction grating 156 mounted above substrate 160 to measure the displacement of the membrane structure 150. A light source 140 is integrated in the device 100 to provide an incident light beam to be shined on the reflective diffraction grating 156 and the reflective membrane 150. A photo-detector 120 is positioned to receive the interference pattern produced by the reflected light beams. The present invention is not limited to the number of photo-detectors. In addition, the present invention includes another embodiment where the photo-detectors are one or more optical fibers. The main part of the device 100 consists of a flexible optically reflective membrane 150 suspended above a non-moving, transparent substrate 160. For displacement detection, the intensity of the light 101 from light source 140 reflected from the membrane 150 and reflective diffraction grating 156 is monitored. Grating 156 consists of periodic reflective fingers positioned atop transparent, yet conductive, electrodes 180 which are deposited atop the transparent substrate 160. Displacement of membrane 150 changes the intensity of the diffraction orders 104 which can be easily detected using standard photo-detector(s) 120. This provides the sensitivity of an optical interferometer, and has a better noise performance as compared to other intensity based commercial optical microphones.

Light source 140 provides incident light beam 101 through substrate 160 to reflective membrane 150. Reflective membrane 150 is positioned to diffraction grating 156 at an odd multiple of a quarter of the wavelength of light source 140. In addition, the device 100 could include a wafer (not shown), preferably a silicon wafer for housing the light source 140 and/or the photo-detector 120.

In order to realize a sensitive microphone one should have a compliant membrane, which can be displaced by pressure fields and a detection scheme to detect membrane displacements at the pressure levels in the order of $10^{-5}$ Pa. The pressure equivalent of the thermal mechanical noise of the membrane structure should be small since this number determines the minimum detectable pressure level. A broadband microphone requires a membrane response free of resonances in the bandwidth of interest and a broadband detection scheme. The micro-machined microphone membrane and the integrated optical detection scheme satisfy these requirements. It can also transmit sound and can be self-calibrating by the application of bias voltages between the electrodes 180 and grating 156. In the following description, the elements and operation of the microphone are discussed in detail.

The light source 140, in this embodiment, may be a laser, that emits an electromagnetic wave at a known wavelength, $\lambda$. An emitted incident light beam 101 would be illuminated onto the reflective diffraction grating 156. In this embodiment, a Helium-Neon (HeNe) laser ($\lambda$=632 nm) may be utilized. In other embodiments, the light source 140 may be a laser emitting another known wavelength. The exact wavelength of the incident light beam 101 may vary as long as the dimensions of the components of the device 100 are calculated in terms of the incident light beam 101 wavelength. To that, light sources emitting more than one known wavelength can be utilized as well, although, preferably, a light source emitting one known wavelength would be utilized. In practice, any kind of temporarily coherent light source with a coherence length equal to or greater than two times the distance between the membrane 150 and the diffraction grating 156 may be utilized. The light source 140 may also be a Vertical Cavity Surface Emitting Laser (VCSEL) mounted on a wafer or printed circuit board.

In other embodiments, the incident light beam 101 may be carried via an optical fiber, in which case the light source 140 may be located remotely. As depicted in FIG. 4, the light source is positioned normal to the plane of the transparent substrate 160. Utilizing an optical fiber adds flexibility in placing the light source 140.

In yet other embodiments, the incident light beam 101 may be guided towards the diffraction grating 156 via a wave guide and/or a set of properly placed mirrors. For instance, the light source 140 may be placed relatively parallel to the lengthwise direction of the transparent substrate 152. In this case, a mirror and/or a wave guide can change the direction of the incident light beam 101 so that it is illuminated at a direction normal to the diffraction grating 156. To that, although it appears that the best results occur when the incident light beam 101 is illuminated at a direction normal to the diffraction grating 156, it need not be necessary. Other wave shaping instruments may be utilized, such as microlens, to collimate the incident light beam 101. The reflected light beams 104 may also be shaped by a system of wave shaping instruments.

The transparent substrate 160 is typically a planar surface, although not necessarily. For example, the substrate 160 may be cut so as to have a rounded surface for the forming the diffraction grating 156. This may aid in focusing the incident light beam 101. A variety of materials can be utilized for the substrate 160. Non-limiting examples are quartz, silicon, sapphire, glass, and combinations thereof. In other embodiments, the substrate 160 may be non-transparent, but a bulk-etched cavity may be incorporated into the substrate 160 to allow illumination. In general, the transmission coefficient, $\tau$, of the transparent substrate 160 for a given wavelength of incident light beam 101 may be larger than 0.9. The dimensions of the transparent substrate 160 can vary according to the overall structure of the device 100, but in general, the lateral thickness of the substrate 160 may be in the range of 0.1 mm–2 mm, and likewise having a working distance of 0.1 mm–2 mm with an F-number from 1 to 5. The lateral length can vary with the structure of the device 100. In other embodiments, the transparent substrate 160 may be configured, upon manufacture, to assist in focusing the diffracted and/or collimated incident light beams.

In an alternative embodiment, the displacement sensitivity can be improved by fabricating a semi-transparent mirror layer on the top surface of the transparent substrate 160.

As mentioned, the diffraction grating 156 may include several equally spaced fingers. In general, the spatial separation between adjacent fingers may be on the order of the wavelength of the incident light beam 101. The fingers may be constructed of a reflective and conductive material that has a reflection coefficient of between 0.8 to 1. The conductivity of the diffraction grating fingers may be necessary for electrostatic actuation of the fingers. In general, the fingers may be shaped as blocks and could also be composed of a conductive material with a non-dielectric reflective coating. In other embodiments, the fingers may be composed of a dielectric material and be coated with a conductive reflective material. The dimensions of the fingers can vary greatly with the wavelength of the incident light beam 101. In this embodiment, however, the dimensions of the fingers may be on the order of the wavelength of the incident light beam 101, or about 0.5 µm to 10 µm. Several fingers (on the order of 10λ in lateral length) may make up the diffraction grating 156. In this embodiment, the diffraction grating 156 is formed above the top planar surface of the transparent substrate 160.

The diffraction grating fingers need not be equally spaced. The diffraction grating 156 may be configured to focus the incident light beam 101 to a given focal point. This may be accomplished by varying the spacing between the fingers in such a way so as to focus the light.

The electrodes 180 are placed in relation to the diffraction grating fingers. In general, the electrodes 180 are a conductive material that is deposited onto the substrate 160. Similar to the diffraction grating fingers, the electrodes 180 may be a dielectric material covered with a conductive coating. The electrodes 180 may also be made of a transparent material coated or doped with a conductive material.

The device 100 also includes a photo-detector 120. In this embodiment, the photo-detector 120 may be placed parallel and underneath the substrate 160. As the figure depicts, the photo-detector 120 may be positioned to receive a higher diffraction order of the reflected light, such as the $1^{st}$ or $3^{rd}$ order. The observation length, x, can vary, but should be properly positioned so that a higher diffraction order may be observed. For example, the observation length x, may vary with the wavelength of the incident light beam 101. The photo-detector 120 may be placed at an optimal longitudinal distance, e.g. 1000 µm, but this may vary with wavelength.

In other embodiments, the photo-detector 120 may be remotely located and the diffracted light may be received via an appropriately placed optical fiber. In yet other embodiments, a wave guide and/or mirrors may change the direction of the diffracted and reflected beams. In this embodiment, as mentioned, the photo-detector 120 is placed parallel to the substrate 160. This allows for a relatively small space, on the order of 100 µm–1000 µm.

Several photo-detectors 120 are known in the art. In general, any photo-detector 120 that can be configured for micromachining and can sustain the desired bandwidth can be utilized. One specific example of a photo-detector 120 that can be used is a silicon P-N junction photodiode. Another type that could be utilized is a P-I-N type photodiode. The utilized photo-detector 120 may depend on the processing speed and responsivity (photocurrent per Watt of incident light) requirements. For example, at wavelengths where the absorption of silicon is small, deeper junction depths may be required to increase responsivity.

Similarly, the geometry of the photo-detector 120 may be adjusted to minimize its capacitance and transit time to increase the detection bandwidth. Some signal conditioning circuitry, such as a transimpedance amplifier, may also be implemented on the same semiconductor substrate as the photo-detector 120 to minimize noise and decrease parasitic capacitance. These photo-detectors 120 with integrated electronics can be configured to operate with bandwidths from DC to GHz range for sensing optical communication applications.

A processor 130 may be included within the device 100, but more than likely will be communicatively coupled to the photo-detector 120 and be an external component. The processor 130 may be any type of electrical component that-can process the signals received by the photo-detector 120. Likewise, hardware, software, and/or firmware may be utilized to properly make the appropriate calculations. For example, a personal computer may be configured to process the signals received from the photo-detector 120 in data that is compiled and calculated to produce the change in distance d as a function of time. A relatively simple digital signal processor (DSP) or an application specific integrated circuit (ASIC) may be utilized to perform the calculations. The processor 130 may also be capable of making several other calculations and/or perform other functions, such as calibration, laser intensity normalization, digital filtering, and signal conditioning.

Coupled to the diffraction grating 156 and electrodes 180 is a controller 170 for controllably adjusting, in this embodiment, the position of the diffraction grating. This is accomplished by electrostatic actuation which is discussed below. The controller 170 may be communicatively coupled to the processor 130. In this manner, force-feedback approaches to measuring the distance d can be accomplished.

The structure of the present invention forms a phase sensitive optical diffraction grating, in which the diffraction pattern is determined by the membrane 150 displacement relative to the diffraction grating 156 (which position can vary, to be discussed below). The incident light will be reflected back to the zeroth order when the gap thickness is an integer multiple of $\lambda/2$, and to the odd diffraction orders when the gap thickness is an odd multiple of $\lambda/4$. Notably, as illustrated in FIG. 3, the change in intensity of both orders per gap thickness is maximized in a periodic fashion in these multiples. Operating the device 100 at the point of maximum change in intensity (the slope of the cos and sin curves of FIG. 3) is beneficial because it maximizes the sensitivity of the device 100.

As illustrated in FIG. 4, the photo-detector 120 is positioned to receive the first order, which has maximum change in intensity at odd multiples of $\lambda/4$. Notably, when a single photo-detector is used to detect the intensity of a diffraction order the output signal will include the effect of laser intensity noise degrading the performance of the device 100. This noise can be eliminated by normalizing the output signal with the laser output power. By way of using arrays of these devices 100 to form a microphone, the noise level will be further reduced by spatial averaging.

In order to operate the device 100 at the maximum sensitivity and to adjust for the ambient pressure changes, there can be a DC bias voltage applied between electrodes 180 and grating 156. Adding an AC signal to the bias, the device 100 can be used as a regular cMUT, which can transmit sound as well as receive acoustic signals. The DC and AC voltages electrostatically actuate the grating fingers causing them to bend (when voltage is applied) toward the electrodes 180, thus causing a change in the distance from grating 156 to reflective membrane 150. This change in distance causes a change in the interference pattern produced, which can be advantageous if the electrostatic actuation is performed in a controlled manner. The controller 170 can be configured to apply the electrical signals to perform the electrostatic actuation. The controller 170 may be coupled to the processor 130 to form a feedback loop. In this manner, the position of the grating 156 can be varied such that the device 100 is calibrated to measure at optimal sensitivity. Furthermore, by utilizing a modulation signal which can be applied to the electrodes 180 and grating 156, and utilizing commonly known frequency lock-in methods noise can be filtered out, thus increasing the SNR of the device 100.

Figure 5:
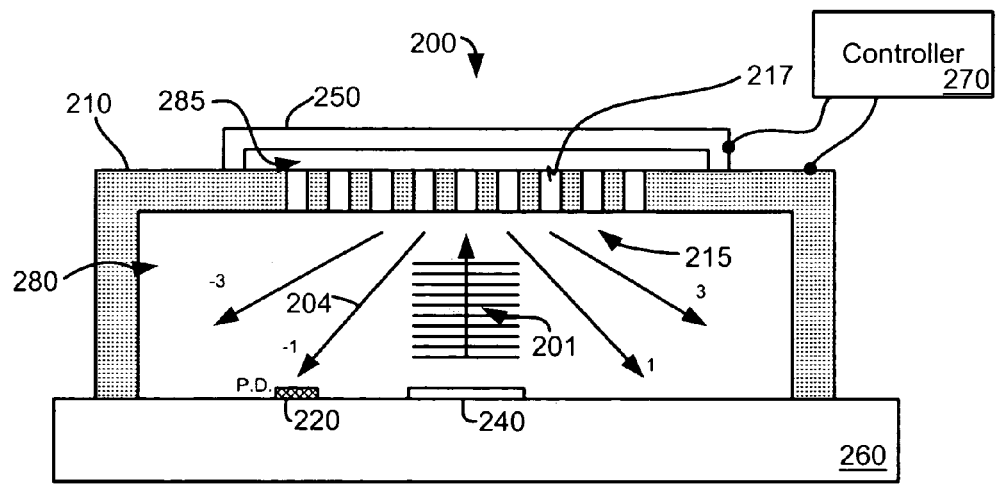
FIG. 5 is a diagram illustrating another embodiment of a micro-displacement measurement device in accordance with the present invention.

FIG. 5 is a diagram illustrating another embodiment of a micro-displacement measurement device 200 in accordance with the present invention. The device includes a light source 240 and a photo-diode 220 on the surface of an opaque, rigid substrate 260. An optical diffraction grating 215 exists above the light source 240 and is characterized by alternating regions of reflective and transparent passages 217. A backside cavity 280 formed between the grating 215 and the substrate 260 may be sealed at some desired pressure (including low pressures) with any gas or gas mixture, or can be open to ambient through an opening with desired flow resistance. Finally a reflective membrane 250 exists above the diffraction grating 215 that reflects light back towards the substrate 260. The diffraction grating 215 and the reflective membrane 250 together form a phase-sensitive diffraction grating.

The diffraction grating 215 is formed on a silicon substrate by first depositing an oxide layer followed by the deposition and patterning of a conductive and reflective thin film such as polysilicon in the form of a grating. A silicon nitride layer deposition is used to encapsulate the grating fingers and then patterned to expose the underlying oxide between the grating fingers. The grating is released by first etching the bulk silicon using a deep reactive ion etching which stops at the oxide layer. This is followed by wet etching of the oxide between the grating fingers hence providing free space optical access to the reflective top membrane.

The reflective membrane 250 is suspended in a bridge-like structure and may be composed of a non-conductive material, such as a stretched polymer membrane, polysilicon, silicon-nitride, or silicon-carbide, and then making the material conductive in a desired region either through depositing and patterning a conductive material such as aluminum, silver, or any metal. Alternatively, the non-conductive material may be doped with a conductive material. The reflective membrane 250 must also be coated with a reflective material, which makes aluminum or silver a good choice. In some applications such as chemical and biological sensors, the reflective membrane 250 can be made of a single material or a multi-layered material that change its optical properties, such as reflectivity in response to a chemical or biological agent for example a polymer film dissolving in a solvent. Similarly, the reflective membrane 250 can be a micromachined cantilever made of single or layered material that deforms, or moves, due to thermal, chemical, or other physical stimulus. For example, the device 200 can be configured to be an infrared (IR) sensor by having a bimorph structure as the reflective membrane 250 that includes an IR absorbing outer layer and a reflective layer facing the light source 240. In some other applications, such as a microphone or a pressure sensor, the reflective membrane 250 can be in the shape of a diaphragm.

A gap 285 is formed between the rigid structure 210 and the reflective membrane 250. The gap 285 should be large enough to have at least one optimal detection sensitivity point, i.e., highest slope of the curves 32, 34 and smaller than half the coherence length of the light source.

The backside cavity 280 is used to adjust the effect of air on the mechanical response of the membrane 250. If the cavity 280 is very small, the spring-like stiffness of the air will be high as compared to the membrane stiffness and hence dominate the overall mechanical response. Utilizing a large cavity, e.g. 500×500×500 $\mu m^3$, the air stiffness can be reduced to negligible levels. Another function of the backside cavity 280 is to provide optical access and longitudinal distance for the separation of diffraction orders for detection by photo-detectors 220.

A controller 270 may be coupled to the reflective membrane 250 and the rigid structure 210 so as to apply a voltage bias to electrostatically actuate the reflective membrane 250. When a controlled voltage bias is applied, various aspects of the reflective membrane 250 can be altered. First, the position, with respect to the diffraction grating 215 can be changed. Secondly the rigidity of the reflective membrane 250 may be altered. In many applications, moving or controlling the position of the reflective membrane 250 will be desired for self-calibration, sensitivity optimization, and signal modulation purposes. For example, if the reflective membrane 250 is a diaphragm as in the case of a microphone or a capacitive micromachined transducer, vibrating the diaphragm to produce sound in a surrounding fluid may be desired for transmission and self-calibration. Also, while measuring the displacement of the diaphragm, controlling the nominal gap height to a position that will result in maximum possible sensitivity for the measurement may be desired.

The substrate 260 may be a printed circuit board, a silicon wafer, or any other solid material. Furthermore, the light source 240 and photo-diode 220 may be constructed or sourced externally and attached to the surface or fabricated directly into the material using integrated circuit or micromachining fabrication techniques.

The light source 240 can be an optical fiber or end of a microfabricated waveguide with an appropriate reflector to direct the light to the desired location in the device 200. The light source 140 of the embodiment illustrated in FIG. 4 is similar to the light source 240 here. Likewise, the photo-diode 220 serves as a specific example of a photo-detector, as discussed in relation to FIG. 4.

The operation of the device 200 is fairly similar to that of device 100. An incident light beam 201 is illuminated upon the diffraction grating 215, where in turn a first portion of the light is reflected back towards the substrate 260. A second portion of the light is diffracted about the diffraction grating 215 and reflected off of the reflective membrane 250 back toward the substrate 260. An interference pattern of the two reflective portions is formed. A photo-diode 220 is positioned to receive, in this embodiment, the first order of the interference pattern. Various functions can alter the reflective membrane 250, thus changing the interference pattern. First, the distance of the reflective membrane 250 relative to the diffraction grating 215 (the gap 285 height) can change due to a number of reasons. One reason is due to a number of external excitations, such as acoustic pressure causing the membrane 250 to vibrate at a particular frequency. Another external excitation may be because of a chemical reaction occurring on the membrane 250, such as change in the residual stress in a composite membrane due to dissolution of one of the layers. A third external excitation may be an infrared light source illuminated upon the membrane 250, causing the membrane 250 to change position. There are a great number of possibilities that can alter the position of the reflective membrane 250, all of which are too many to list here. The controller 270 can also be factored into the movement of the reflective membrane 250 either in a modulated approach or a static approach.

Second, the reflectivity of the membrane 250 may be altered, such that the power level of the second portion of the reflected light is altered. This change in the power level can be detected by the photo-diode 220. The reflectivity of the membrane 250 may be altered by a chemical or biological reaction. Examples of these reactions can be those causing a color change or change in membrane thickness. It is well known that the reflectivity of thin films strongly depends on thickness. Therefore corrosion, etching, or deposition of different materials on the membrane 250 due to chemical or biological processes will alter the reflected light.

Third, the rigidity of the membrane 250, and thus the magnitude in which the membrane 250 will vibrate can be altered in time and measured by the photo-diode 220. The rigidity of the membrane 250 may be a factor of an external force, but more than likely will be caused by an electrostatic charge applied by the controller 270. Varying the rigidity of the membrane 250 provides for another possibility. That is to vary the rigidity of the membrane 250 as a function of the acoustic pressure applied to the membrane 250. The attempt would be to keep the membrane 250 as still as possible. With this approach, one can measure the varying voltage needed to accomplish this, and thus be using a force-feedback approach to measure the applied acoustic pressure. Force-feedback is a well known method in the art that can typically produce more accurate and sensitive results. The device 200 can be made at such a small scale, that it is very practical to string together these devices in an array or matrix structure. Being able to build microphone arrays on a single substrate over a small surface area allows fabrication of devices with closely matched responses. By measuring the acoustic pressure using several closely spaced, matched microphone array elements the pressure gradients may be measured accurately to implement acoustic intensity probes. Furthermore, some signal processing methods such as gradient flow algorithms results in significant noise reduction using a two-dimensional array of microphone arrays with a periodicity much smaller than the acoustic wavelength. The present invention enables implementation of such closely spaced microphones without loss of signal fidelity.

Figure 6:
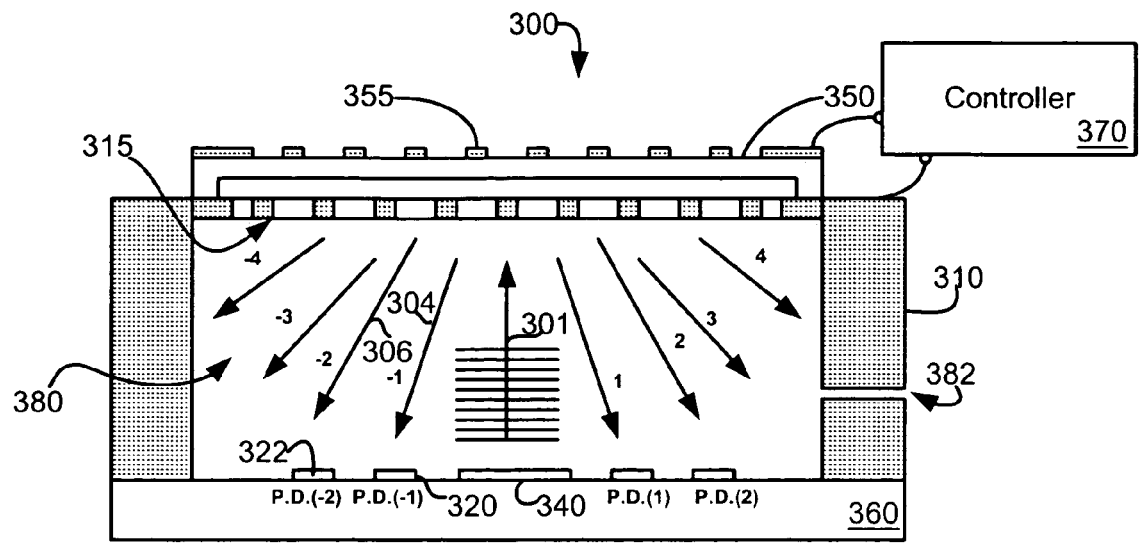
FIG. 6 is a diagram illustrating another embodiment of a micro-displacement measurement device in accordance with the present invention.

FIG. 6 illustrates some variations to the embodiment illustrated in FIG. 5. First, an air release channel 382 could be implemented in either of the devices 200 or 300. The air release channel 382 serves to equalize the pressure inside the cavity 380 with the ambient pressure preventing the collapse of the microphone membrane 350 in response to changing ambient pressure which can be due to wind or other non-acoustic changes in atmospheric pressure.

Secondly, a second diffraction grating 355 can be deposited on a transparent membrane 350 rather than a membrane with a mirror-like uniform reflective surface as in the previous embodiments. The grating 355 on the membrane 350 has the same periodicity as the first, the reference, diffraction grating 315, but is offset and has diffraction grating fingers whose width is smaller than the gap between the fingers of the reference diffraction grating 315. This structure allows some of the incident light to transmit through the whole device 300 and also introduces new diffraction orders in the reflected field. This produces a new kind of phase grating.

To understand the operation one can consider the phase of the light reflected from the reference grating ($\phi_1$) and the grating on the membrane ($\phi_2$). When the difference between $\phi_1$ and $\phi_2$ is $2k\pi$, k=0, 2, 4, . . . , the apparent period of the grating is $\Lambda_g$ (apparent reflectivity of 1, 0, 1, 0 regions assuming perfect transmission through the transparent membrane 350) and the even diffraction orders are reflected with angles $$\sin(\theta_n) = n\frac{\lambda}{\Lambda_g}, n = 0, \pm 2, \pm 4 \ldots$$

In contrast, when the difference between $\phi_1$ and $\phi_2$ is $m\pi$, m=1, 3, 5, . . . , the apparent period of the grating is $2\Lambda_g$ (apparent reflectivity of 1, 0, −1, 0, 1 regions assuming perfect transmission through the transparent membrane 350) and the odd diffraction orders are reflected with angles $$\sin(\theta_n) = n\frac{\lambda}{2\Lambda_g}, n = 1, \pm 3, \pm 5 \ldots$$

Here it is assumed that the width of the reflective grating fingers on the reference grating 315 and the grating 355 on the membrane 350 are the same. This does not have to be the case if the interfering beams go through different paths and experience losses due to reflection at various interfaces and also incidence angle variations. The diffraction grating geometry can then be adjusted to equalize the reflected order intensities with optimized interference.

Note that in this embodiment, the intensity of the odd and even numbered orders change with 180° out of phase with each other when the gap between the reference and sensing diffraction grating changes. The even numbered diffraction orders are in phase with the zero order reflection. The advantage of having other off-axis even diffraction orders in phase with the specular reflection is that it enables one to easily use differential techniques. This is achieved by taking the difference of the outputs of two detectors (i.e., photo-diodes 320 and 322) to detect odd and even orders, respectively. Hence, the common part of the laser intensity noise which is common on both orders can be eliminated.

Similar electrostatic actuation techniques can be applied by the controller 370. Furthermore, similar to the device 200 of FIG. 5, the device 300 can be fabricated at such a small scale that it is very feasible to arrange many devices 300 in an array or matrix structure.

Figure 7:
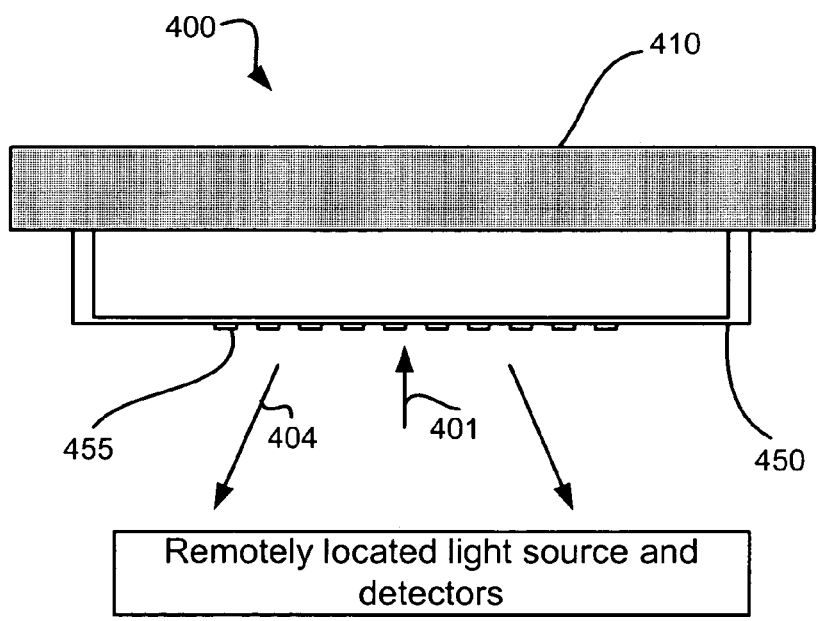
FIG. 7 is a diagram illustrating yet another embodiment of a micro-displacement measurement device in accordance with the present invention.

FIG. 7 illustrates yet another embodiment of the present invention. In this embodiment, a reflective diffracting grating 455 is located on a transparent membrane 450. A platform 410 includes a reflective surface, and the device 400 forms a phase sensitive diffraction grating when illuminated from the bottomside of the membrane 450 with an incident light beam 401. The zero and all odd orders are reflected back and have intensities that depend on the distance between the grating 455 and the platform 410. Note that this gap includes the thickness of the membrane 450, which may be made of any transparent material. Examples include silicon dioxide, silicon nitride, quartz, sapphire, or a stretched polymer membrane such as parylene.

Since the only requirement of the platform 410 is to be reflective, any material including semiconductor substrates or plastics can suffice given that they are coated with a reflective layer, such as metal. To add the electrostatic actuation feature, a region of both the platform 410 and the membrane 450 must be made electrically conductive. For the membrane 450, this can be accomplished by using a material that is both reflective and conductive for the diffraction grating 455.

This particular embodiment offers remote sensing capabilities, as the light source, as well as any photo-detectors, may be located remote from the device 400. For example, if measuring the displacement of the membrane 450 due to a change in pressure is desired (as would be the case for a pressure sensor or a microphone), the platform 410 can be attached to a surface and the light source and detectors can be stationed in a remote location not necessarily close to the membrane 450.

In addition to remote measurements, this device 400 can be remotely actuated to modulate the output signal. For example, an acoustic signal at a desired frequency can be directed to the membrane 450 and the output signal can be measured at the same frequency using a method such as a lock-in amplifier. The magnitude and phase of the output signal would give information on the location of the membrane 450 on the optical intensity curve of FIG. 3, which in turn may depend on static pressure, and other parameters such as temperature, etc. Similar modulation techniques can be implemented using electromagnetic radiation, where an electrostatically biased membrane 450 with fixed charges on it can be moved by applying electromagnetic forces. In this case, the membrane 450 would be made with a dielectric material with low charge leakage.

Figure 8:
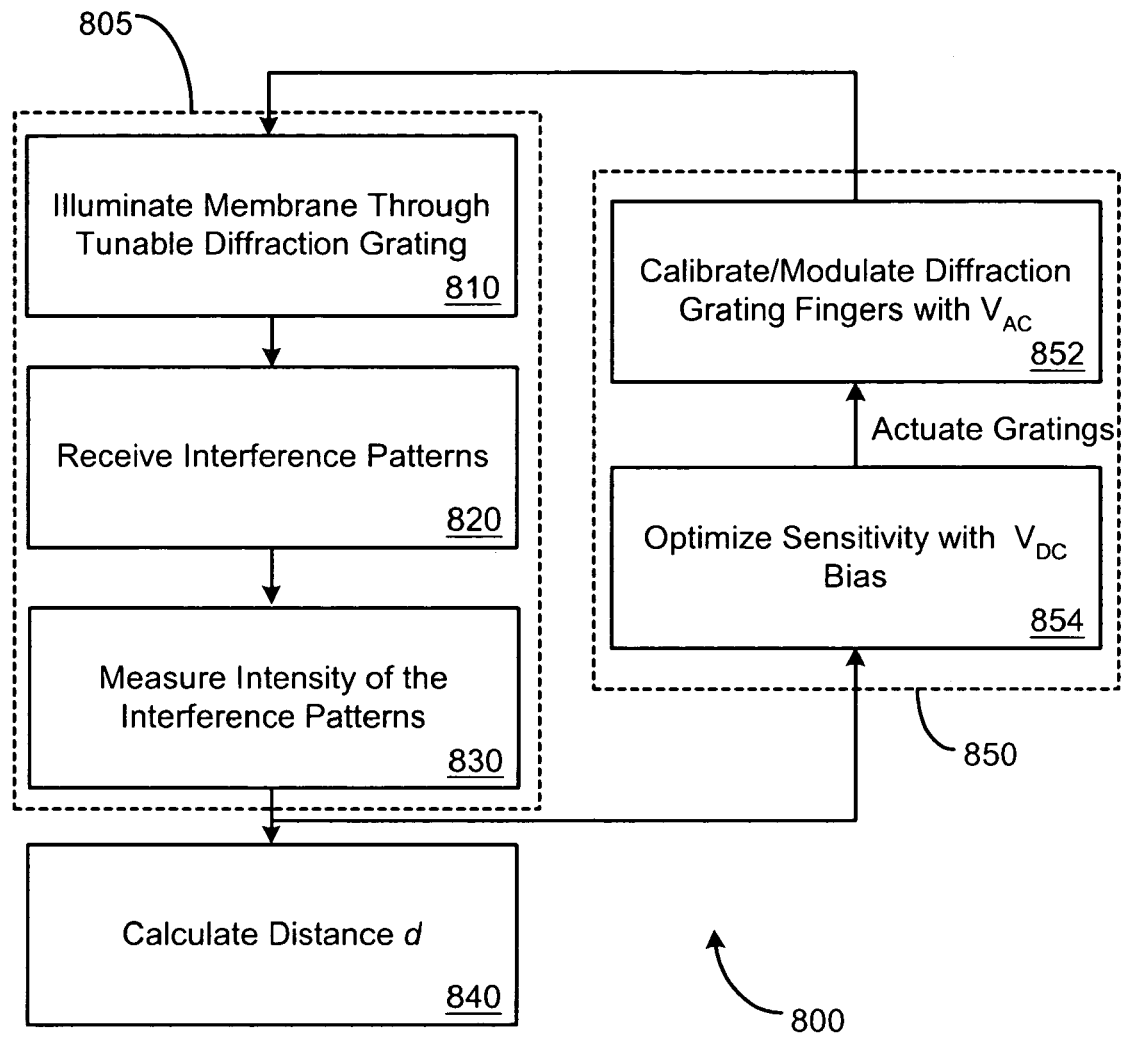
FIG. 8 is a flow chart illustrating a method for optimizing the sensitivity of a micro-displacement measurement device and more generally improving the overall performance of a micro-displacement measurement device in accordance with embodiments of the present invention.

FIG. 8 is a flow chart illustrating a method 800 for optimizing the sensitivity of a micro-displacement measurement device and more generally improving the overall performance of a device in accordance with embodiments of the present invention.

The method 800 begins with measuring the distance d (step 805). Once the distance is measured by the device, the measurement data can be processed so that the distance can be calculated (step 840). Typically, this can be performed by a processor, which may be a computing device such as a personal computer. The processor may be configured to perform several other functions with the data as well.

Either before or after the data is calculated, a control signal may be generated based on the measured and/or calculated data to actuate fingers of a tunable diffraction grating of the device (step 850) or actuate the reflective membrane. Once the device has been appropriately actuated, the measurements may be made again. This procedure may continue, as the feedback loop provides for constant monitoring.

As described in sufficient detail in prior figures, several embodiments of devices can properly measure the distance d, and the change of d in time. A simplified description of the general method of measuring the distance may begin with illuminating the reflective membrane with an incident light beam through the tunable diffraction grating (step 810). Once illuminated, interference patterns can develop through constructive and destructive interference of reflected light off of the tunable diffraction grating and reflections off of the membrane that has been diffracted through the diffraction grating. A photo-detector may then receive the interference pattern (step 820). Once received proper electrical components working with the photo-detector or included within the photo-detector may then measure the intensity of light of the interference patterns (step 830). Interpretation of the interference patterns may come in subsequent calculations.

From either the measured intensity of the interference patterns or from processed calculations, a voltage potential may be generated that carries proper actuation information. The voltage potential may carry a DC portion that can deform chosen fingers of the tunable diffraction grating to certain predetermined optimum positions. Alternatively, the reflective membrane may be actuated and moved to a position that produces optimum sensitivity (step 854). Upon actuation, an AC portion of the voltage potential may also be supplied that can act as a calibration signal during sensitivity optimization. For example, the DC bias can be changed until the diffracted light intensity variation at the AC signal frequency is maximized for a certain AC displacement. The AC signal can also act as a modulation signal to vary the distance d at a known frequency (step 852). As a result, upon, calculation, known frequency lock-in detection techniques can be used to lock in at the modulating frequency. Any vibrations from noise can thus be overcome, because, in essence they are modulated out. Improving the sensitivity of the device and eliminating noise in the system can help optimized the performance of the device.

It should be emphasized that the above-described embodiments of the present invention, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of the present invention and protected by the following claims.

What is claimed is:

1. A device comprising:
   a substrate;
   a rigid structure suspended above said substrate to form a backside cavity, formed in said rigid structure is a reflective diffraction grating, said diffraction grating being positioned to reflect a first portion of an incident light and transmit a second portion of the incident light such that the second portion of the incident light is diffracted;
   a membrane positioned a distance d above said reflective diffraction grating; and
   at least a first photo-detector for receiving interference patterns produced from the first portion of the incident light reflected from said diffraction grating and the second portion of the incident light reflected from said membrane.

2. The device of claim 1, further comprising:
   a controller coupled to said membrane for controllably adjusting at least a first feature of said membrane.

3. The device of claim 2, wherein said controller controllably adjusts said membrane by way of electrostatic actuation.

4. The device of claim 2, wherein said controller controllably adjusts the rigidity of said membrane.

5. The device of claim 2, wherein said controller controllably adjusts the distance d said membrane is from said diffraction grating.

6. The device of claim 1, further comprising:
   a controller coupled to said reflective diffraction grating for controllably adjusting at least a first feature of said reflective diffraction grating.

7. The device of claim 6, wherein said controller controllably adjusts said reflective diffraction grating by way of electrostatic actuation.

8. The device of claim 6, wherein said controller controllably adjusts the rigidity of said reflective diffraction grating.

9. The device of claim 6, wherein said controller controllably adjusts the distance d said diffraction grating is from said membrane.

10. The device of claim 1, wherein said membrane is transparent and wherein said device further comprises:
a second reflective diffraction grating formed atop said transparent membrane, whereby the second portion of the incident light received by said at least first photo-detector is reflected from said second reflective diffraction grating.

11. The device of claim 1, further comprising a processor for calculating, from the produced interference patterns, the distance d.

12. The device of claim 1, further comprising a processor for calculating, from the produced interference patterns, a relative change in the distance d produced by external excitation of the membrane.

13. The device of claim 1, wherein said membrane comprises an infrared absorbing outer layer, such that when infrared radiation is exposed to the outer layer, said membrane deforms.

14. The device of claim 1, wherein said backside cavity is gas filled.

15. The device of claim 1, wherein the membrane comprises a metal film and a dielectric stack.

16. The device of claim 1, wherein the reflective diffraction grating comprises semitransparent grating fingers.

17. The device of claim 16, wherein the semitransparent grating fingers comprise a thin metal.

18. The device of claim 1, further comprising:
a semi-transparent mirror fabricated on the surface of said substrate, whereby said diffraction grating is positioned atop the semi-transparent mirror.

19. The device of claim 18, wherein said semi-transparent mirror comprises a thin metal film.

20. The device of claim 19, wherein said thin metal film is composed of silver.

21. The device of claim 18, wherein said semi-transparent mirror comprises:
an alternating stack of dielectric media.

22. The device of claim 18, wherein the membrane comprises a metal film and a dielectric stack.

23. A device comprising:
a substrate;
a tunable, phase-sensitive, reflective diffraction grating formed atop said substrate, said diffraction grating being configured to reflect a first portion of an incident light and transmit a second portion of the incident light, such that the second portion of the incident light is diffracted, said diffraction grating being further configured to be controllably adjusted;
at least a first electrode deposited on said substrate;
a membrane bridge structure positioned above said diffraction grating;
a photo-detector for receiving interference patterns produced from the first portion of the incident light reflected from said diffraction grating and the second portion of the incident light reflected from the membrane bridge structure; and
a controller coupled to said at least first electrode and said diffraction grating for adjusting said diffraction grating, such that the interference patterns are altered.

24. The device of claim 23, further comprising a processor for calculating, from the produced interference patterns, the relative distance between the membrane structure and a reference point of said device.

25. The device of claim 23, wherein said diffraction grating comprises a plurality of diffraction grating fingers positioned substantially linearly along a plane of said substrate.

26. The device of claim 25, wherein the position relative to said substrate of at least one of said diffraction grating fingers is controllably adjusted by electrostatic actuation.

27. The device of claim 26, wherein the position of the at least one finger may be changed to a position to optimize the sensitivity of said device.

28. The device of claim 23, wherein said controller adjusts said diffraction grating in a modulated fashion.

29. The device of claim 23, wherein said substrate is substantially transparent.

30. The device of claim 29, wherein said substantially transparent substrate is comprised of quartz.

31. The device of claim 29, further comprising:
a semi-transparent mirror fabricated on the surface of said substrate, whereby said diffraction grating is positioned atop the semi-transparent mirror.

32. The device of claim 31, wherein said semi-transparent mirror comprises a thin metal film.

33. The device of claim 32, wherein said thin metal film is composed of silver.

34. The device of claim 31, wherein said semi-transparent mirror compnses:
an alternating stack of dielectric media.

35. A micromachined, optoelectronic microphone comprising:
a phase-sensitive reflective diffraction grating for reflecting a first portion of an incident light and transmitting a second portion of the incident light such that the second portion of the incident light is diffracted, said diffraction grating being further configured to be controllably adjusted by electrostatic actuation; and
a microphone diaphragm positioned a distance d above said diffraction grating, whereby the second portion of the incident light is reflected off of the microphone diaphragm such that an interference pattern is formed by the reflected first portion and the reflected second portion of the incident light.

36. The microphone of claim 35, wherein said microphone diaphragm and said reflective diffraction grating comprise at least a partially conductive material.

37. The microphone of claim 36, wherein said microphone diaphragm is configured to receive a voltage bias to controllably adjust the rigidity of said microphone diaphragm.

38. The microphone of claim 36, wherein said microphone diaphragm and said diffraction grating are configured to receive a voltage bias to controllably adjust the position of said microphone diaphragm relative to said diffraction grating.

39. The microphone of claim 35, further comprising:
at least a first photo-detector for receiving the interference pattern.

40. The microphone of claim 39, further comprising:
a processor coupled to said at least first photo-detector and configured to calculate the change in the distance d by measuring the change in the interference pattern received by said at least first photo-detector.

41. The microphone of claim 40, wherein the change in the distance d is a factor of the displacement of the microphone diaphragm due to an external excitation.

42. The microphone of claim 41, wherein the external excitation is acoustic pressure.

43. The microphone of claim 40, wherein the change in the distance d is a factor of the displacement of the microphone diaphragm due to electrostatic actuation.

44. The microphone of claim 40, wherein the change in the distance d is a factor of the displacement of the diffraction grating due to electrostatic actuation.

45. A method for measuring an external excitation, the method comprising:

illuminating a membrane through a reflective diffraction grating with an incident light beam, the diffraction grating being positioned a distance d from the membrane and being formed in a rigid structure that is suspended above a substrate to form a backside cavity;

reflecting a first portion of the incident light from the diffraction grating and transmitting a second portion of the incident light through the diffraction grating such that the second portion of the incident light is diffracted;

receiving interference patterns produced by reflections off the diffraction grating interfering with reflections off the membrane; and measuring a change in intensity of the interference patterns; and calculating a change in the distance d from the measured change in intensity of the interference patterns.

46. The method of claim 45, further comprising:

controllably adjusting at least one feature of the membrane to counteract the effect to the membrane caused by the external excitation; and measuring the external excitation as a function of a variable signal needed to controllably adjust the at least one feature of the membrane to counteract the effect caused by the external excitation.

47. The method of claim 45, further comprising:

controllably adjusting at least one feature of the membrane to optimize the performance of the device.

48. The method of claim 45, further comprising:

controllably adjusting at least one feature of the diffraction grating to optimize the performance of the device.

49. The method of claim 45, wherein the change in the distance d is a function of the external excitation.

50. A micromachined, optoelectronic microphone comprising:

a phase-sensitive reflective diffraction grating for reflecting a first portion of an incident light and transmitting a second portion of the incident light such that the second portion of the incident light is diffracted;

a microphone diaphragm positioned a distance d above said diffraction grating, whereby the second portion of the incident light is reflected off of the microphone diaphragm such that an interference pattern is formed by the reflected first portion and the reflected second portion of the incident light;

at least a first photo-detector for receiving the interference pattern; and a processor coupled to said at least first photo-detector and configured to calculate the change in the distance d by measuring the change in the interference pattern received by said at least first photo-detector, wherein the change in the distance d is a factor of the displacement of the diffraction grating due to electrostatic actuation.

51. The microphone of claim 50, wherein said microphone diaphragm and said reflective diffraction grating comprise at least a partially conductive material.

52. The microphone of claim 51, wherein said microphone diaphragm is configured to receive a voltage bias to controllably adjust the rigidity of said microphone diaphragm.

53. The microphone of claim 51, wherein said microphone diaphragm and said diffraction grating are configured to receive a voltage bias to controllably adjust the position of said microphone diaphragm relative to said diffraction grating.

54. The microphone of claim 50, wherein the change in the distance d is also a factor of the displacement of the microphone diaphragm due to an external excitation.

55. The microphone of claim 54, wherein the external excitation is acoustic pressure.

56. The microphone of claim 50, wherein the change in the distance d is also a factor of the displacement of the microphone diaphragm due to electrostatic actuation.

* * * * *